United States Patent [19]
Uthoff, Jr.

[11] Patent Number: 5,851,588
[45] Date of Patent: Dec. 22, 1998

[54] METHOD FOR MAKING OPEN-MESH CARBON-FIBER-REINFORCED CARBON COMPOSITE MATERIAL

[75] Inventor: Loren H. Uthoff, Jr., Northville, Mich.

[73] Assignee: Eaton Corporation, Cleveland, Ohio

[21] Appl. No.: 754,573

[22] Filed: Nov. 21, 1996

[51] Int. Cl.$^6$ ........................................................ B05D 3/02
[52] U.S. Cl. ........................ 427/228; 427/236; 427/372.2; 427/427; 427/428; 427/443.2
[58] Field of Search ..................................... 427/228, 236, 427/372.2, 428, 427, 443.2

[56] References Cited

U.S. PATENT DOCUMENTS

| | | |
|---|---|---|
| 3,895,084 | 7/1975 | Bauer . |
| 4,265,982 | 5/1981 | McCreary et al. . |
| 4,291,794 | 9/1981 | Bauer . |
| 4,472,454 | 9/1984 | Houdayer et al. . |
| 4,700,823 | 10/1987 | Winckler . |
| 4,752,503 | 6/1988 | Thebault . |
| 4,761,308 | 8/1988 | Gebhardt et al. . |
| 4,766,013 | 8/1988 | Warren . |
| 4,849,146 | 7/1989 | Tanji et al. . |
| 4,883,686 | 11/1989 | Doehler et al. . |
| 5,077,130 | 12/1991 | Okuyama et al. . |
| 5,597,617 | 1/1997 | DeLiso et al. ........................ 427/228 |

*Primary Examiner*—Bernard Pianalto
*Attorney, Agent, or Firm*—Lynn E. Cargill; Susan M. Cornwall; Loren H. Uthoff

[57] ABSTRACT

A method for making a carbon composite material includes coating a carbon-fiber meshed cloth substrate with a liquid form of a carbon source and carbonizing the coating on the coated substrate by heating the coated substrate to a carbonizing temperature. The thickness of the coating on the substrate is such that, upon carbonization of the coating, the carbonized coated substrate retains porosity and a discernible surface texture.

17 Claims, No Drawings

METHOD FOR MAKING OPEN-MESH CARBON-FIBER-REINFORCED CARBON COMPOSITE MATERIAL

BACKGROUND OF THE INVENTION

1. Field of the Invention

The present invention relates generally to a method for making open-mesh carbon-fiber-reinforced carbon composite material and, more particularly, to a method for making a single layer open-mesh carbon-fiber-reinforced carbon composite material.

2. Description of the Related Art

In automobile clutches, brakes, automatic transmissions, limited slip differentials, hoists and similar friction power transmission and energy absorption devices, the devices typically include at least two cooperating members. Generally, at least one of the cooperating members has a friction material surface adapted to be moved into and out of frictional engagement with an opposing surface on the other cooperating member. In liquid-cooled power transmission or energy absorption devices, the friction material is typically in the form of a facing which is affixed to the cooperating member.

Some of the desirable characteristics of the friction material include high wear resistance, high heat resistance, high coefficients of friction, consistent coefficients of friction over wide heat and load ranges and long time periods, and close or identical static and dynamic coefficients of friction. One friction material which has these desirable characteristics consists of a porous carbon-fiber-reinforced carbon composite material, as disclosed in U.S. Pat. No. 4,700,823 to Winckler, which patent is incorporated herein by reference.

The composite material disclosed in the Winckler patent is prepared by coating carbon onto a meshed cloth substrate using chemical vapor deposition (CVD). However, CVD is a time-consuming technique (often requiring greater than 100 hours) and requires elaborate facilities and equipment. The extensive time requirement and the expensive facilities and equipment required renders the composite material expensive and often cost-prohibitive for many applications in the automotive industry.

Therefore, the present invention seeks to provide an improved method for making an open-mesh carbon-fiber-reinforced carbon composite material.

Another advantage being sought by the present invention is the provision of a method for making an open-mesh carbon-fiber-reinforced carbon composite material which method is less expensive and time-consuming than previous methods.

Still another advantage being sought by this invention is the provision of a method for making an open-mesh carbon-fiber-reinforced carbon composite material which method requires less elaborate facilities and equipment than previous methods for CVD techniques.

SUMMARY OF THE INVENTION

One embodiment of the present invention is a method for making an open-mesh carbon-fiber-reinforced carbon composite material. The method includes coating a carbon-fiber meshed cloth substrate with a liquid form of a carbon source and carbonizing the coating on the coated cloth substrate by heating the coated cloth substrate to a carbonizing temperature. The thickness of the coating on the cloth substrate is such that, upon carbonization of the coating, the carbonized coated cloth substrate retains porosity.

The second embodiment of the present invention is also a method for making an open-mesh carbon-fiber-reinforced carbon composite material. The second embodiment includes the steps of forming a liquid form of a carbon source, coating a carbon-fiber meshed cloth substrate with the liquid form of the carbon source, and carbonizing the coating on the coated cloth substrate. Forming the liquid form of the carbon source is conducted by either admixing a liquid diluent to the carbon source or melting the carbon source. As in the first embodiment, the thickness of the coating on the cloth substrate is such that, upon carbonization of the coating, the carbonized coated cloth substrate retains porosity. The carbonizing step is conducted by heating the coated cloth substrate to a carbonizing temperature of from about 600° C. to about 2500° C.

The third embodiment of the present invention is a method for making a single layer open-mesh carbon-fiber-reinforced carbon composite material. The method includes forming a liquid form of a carbon source, coating a single layer carbon-fiber meshed cloth substrate with the liquid form of the carbon source, and carbonizing the coating on the coated cloth substrate. The carbon source may be a thermoplastic or thermoset resin. Making the liquid form of the carbon source may be accomplished by either admixing a liquid diluent to the carbon source or melting the carbon source. The thickness of the coating on the cloth substrate is such that, upon carbonization of the coating, the carbonized coated cloth substrate retains porosity. The carbonizing step is performed by heating the coated cloth substrate to a carbonizing temperature of from about 600° C. to about 2500° C. Before coating, the cloth substrate has a discernible surface texture, and the open-mesh carbon-fiber-reinforced carbon composite material formed by the method has a discernible surface texture similar to that of the cloth substrate.

Other advantages of the present invention will be readily appreciated as the same becomes better understood after reading the subsequent description.

DESCRIPTION OF THE PREFERRED EMBODIMENT(S)

One method of the present invention is a method for making an open-mesh carbon-fiber-reinforced carbon composite material. The method includes coating a carbon-fiber meshed cloth substrate with a liquid form of a carbon source and carbonizing the coating on the coated cloth substrate by heating the coated cloth substrate to a carbonizing temperature.

The carbon-fiber meshed cloth substrate is a cloth substrate which may be composed of carbon or graphite fibers, even though it is referred to as a "carbon-fiber" meshed cloth substrate. Carbon fibers are fibers produced by heat treating both natural and synthetic fibers of materials, such as wool, rayon, polyacrylonitrile, and pitch, at temperatures on the order of about 1000° C. Graphite fibers are fibers produced by heat treating carbon fibers at graphitizing temperatures on the order of 2000° C. or more.

Optionally, inorganic fibers or inorganic materials made of, e.g., silicon carbide, alumina, or carbon black, may be included in the carbon or graphite fabric.

The carbon-fiber meshed cloth substrate may be woven or nonwoven fabric. Woven fabric is a fabric formed by interlacing warp and filling threads on a loom or the like. Woven fabric substrates used in the present invention are preferably in the form of a single layer of cloth. Nonwoven fabric is coherent fibrous material formed without uniform interlacing of threads, such as batting or felt. Felt is a fabric formed of fibers through the action of heat and pressure.

The carbon-fiber meshed cloth substrate is preferably from about 0.001 inch to about 0.1 inch thick, more preferably, from about 0.01 to about 0.08 inch thick. The carbon-fiber mesh cloth substrate is flexible, pervious to light, has many "through" pores and has relatively large surface pores. Preferably, the cloth substrate has a porosity of from about 25% to about 95%, and, more preferably, from about 30% to about 60%.

The carbon-fiber meshed cloth substrate exhibits a discernible surface texture. The term "discernible surface texture" is used to mean a surface texture that is identifiable and distinct from other surface textures. When the surface texture has a relatively open mesh which is readily penetrated by an adhesive to improve bonding of the friction material to a support surface.

The carbon source which is used to coat the carbon-fiber meshed cloth substrate is typically a carbon-containing resin, selected from both thermoplastic and thermoset resins. Exemplary thermoplastic resins include the various pitches, such as tar pitch, coal pitch, petroleum pitch, pine pitch, vegetable pitch, and wool pitch. Exemplary thermosetting resins include phenol resin and furan resin. Such resins are often semisolid or solid.

The carbon source may be coated onto the cloth substrate in liquid form. The carbon source may be made into liquid form, for example, by admixing the carbon source with a liquid diluent and/or by melting the carbon source. When the carbon source is admixed with a diluent, the diluent may be either a solvent for the carbon source or may merely be a suspension medium. Typical solvents for resins include carbon disulfide, caustic solutions, such as aqueous sodium hydroxide solutions, and organic solvents, such as benzene, nitrobenzene, acetone, ethers including petroleum ether, chloroform, anthracene, and alcohols including methanol. A typical suspension medium is water.

When the liquid form of the carbon source is formed by melting the carbon source, the carbon source is typically heated to at least the melting temperature of the carbon source. Typical melting temperatures are from about 50° C. to about 200° C., more typically, from about 60° C. to about 150° C.

The cloth substrate may be coated with the liquid form of the carbon source in many ways. For example, the cloth substrate may be coated by dipping the cloth substrate into the liquid form of the carbon source, by roll coating the liquid form of the carbon source onto the cloth substrate, or by spraying the liquid form of the carbon source onto the cloth substrate.

The liquid form of the carbon source is coated onto the cloth substrate at a level such that, after carbonization of the coating, the carbonized coated cloth substrate maintains some porosity. Preferably, the porosity of the carbonized coated cloth substrate is from about 25% to about 95%, and, more preferably, from about 30% to about 60%. Preferably, the level of coating is such that the carbonized coated cloth substrate is flexible, pervious to light, has many "through" pores, has relatively large surface pores, retains a substantial amount of the flexibility and compressibility that the cloth substrate had prior to the coating and carbonization of the coating, and is readily penetratable by an adhesive. Additionally, it is preferred that the carbonized coated cloth substrate has a discernible surface texture similar to that of the cloth substrate before coating.

When the carbon source is made in liquid form by admixing it with a liquid diluent, the method may optionally include drying the coated cloth substrate to remove at least some of the diluent from the coating before carbonizing the coating. Drying may be accomplished at atmospheric pressure in a furnace having a temperature of from greater than 25° C. to less than 600° C., more preferably, from about 100° C. to about 500° C. Drying of the coated cloth substrate before carbonizing will typically result in a more uniform carbonized product.

After coating and, optionally, drying, the coating on the cloth substrate is then carbonized by heating the coated cloth substrate to a carbonizing temperature. The heating may performed in a furnace at atmospheric pressure. Preferably, the heating is performed in a non-oxidizing atmosphere such as argon or nitrogen. The carbonizing temperature is any temperature which carbonizes the coating on the coated cloth substrate. Typically, the carbonizing temperature is from about 600° C. to about 2500° C. It is desirable that the heating be increased gradually, e.g., at a rate of from about 1 to about 200° C./hour. The carbonizing temperature is maintained until the coating on the cloth substrate is substantially carbonized. The term "substantially carbonized" means that at least about 80%, more preferably, about 90%, of the coating is carbonized.

The product formed by the method of the present invention is an open-mesh carbon-fiber-reinforced carbon composite material, preferably, a single layer open-mesh carbon-fiber-reinforced carbon composite material. Also preferably, the open-mesh carbon-fiber-reinforced carbon composite material has a discernible surface texture similar to that of the cloth substrate from which the composite material was formed.

The composite material formed by the present method is typically flexible, pervious to light, has many "through" pores and has relatively large surface pores. Preferably, the composite material has a porosity of from about 25% to about 95%, and, more preferably, from about 30% to about 60%. The composite material is characterized by retaining a substantial amount of the flexibility and compressibility that the cloth substrate had prior to the coating and carbonization of the coating. It is preferred that the open mesh of the composite material be readily penetratable by an adhesive to improve bonding of the composite material to a solid substrate, if desired.

The industrial applicability of the present invention includes applications which require strong, yet relatively light-weight porous materials, such as the friction material used in liquid-cooled automobile clutches, brakes, automatic transmissions, limited slip differentials, hoists and similar friction power transmission and energy absorption devices.

What is claimed is:

1. A method for making an open-mesh carbon-fiber-reinforced carbon composite material formed substantially of carbon, the method comprising the steps of:

coating a carbon-fiber meshed cloth substrate with a liquid form of a carbon source, the thickness of the coating being such that, upon carbonization of the coating, the carbonized coated cloth substrate retains porosity, is open-mesh having through pores, and is light-pervious; and carbonizing the coating on the coated cloth substrate by heating the coated cloth substrate to a carbonizing temperature so that an open-mesh, light-pervious carbon-fiber-reinforced carbon composite material having through pores and formed substantially of carbon is formed.

2. The method according to claim 1, wherein the coating step is accomplished by a technique selected from the group consisting of dipping, roll coating, and spraying.

3. The method according to claim 1, wherein the carbon source is selected from the group consisting of thermoplastic resins and thermoset resins.

4. The method according to claim 1, wherein the carbon source is selected from the group consisting of pitches, phenol resin, and furan resin.

5. The method according to claim 1, further comprising forming the liquid form of the carbon source, the forming being accomplished by a technique selected from the group consisting of (i) admixing a liquid diluent to the carbon source and (ii) melting the carbon source.

6. The method according to claim 1, further comprising admixing a liquid diluent to the carbon source prior to the coating step and drying the coated cloth substrate after the coating step but before the carbonizing step to remove at least some of the liquid diluent from the coated cloth substrate, the drying being performed at a temperature of from greater than 25° C. to less than 600° C.

7. The method according to claim 1, wherein the carbonizing temperature is from about 600° C. to about 2500° C.

8. The method according to claim 1, wherein the cloth substrate is coated and carbonized as a single layer, thereby forming a single layer open-mesh carbon-fiber-reinforced carbon composite material.

9. The method according to claim 1, wherein the cloth substrate has a discernible surface texture and the open-mesh carbon-fiber-reinforced carbon composite material has a discernible surface texture similar to the texture of the cloth substrate.

10. A method for making an open-mesh carbon-fiber-reinforced carbon composite material formed substantially of carbon, the method comprising the steps of:

forming a liquid form of a carbon source by a technique selected from the group consisting of (i) admixing a liquid diluent to the carbon source and (ii) melting the carbon source;

coating a single layer carbon-fiber meshed cloth substrate in the form of a flexible woven fabric with the liquid form of the carbon source, the thickness of the coating being such that, upon carbonization of the coating, the carbonized coated cloth substrate retains porosity, is open-mesh having through pores and is light-pervious; and carbonizing the coating on the coated cloth substrate by heating the coated cloth substrate to a carbonizing temperature of from about 600° C. to about 2500° C. so that a flexible open-mesh light-pervious carbon-fiber-reinforced carbon composite material having through pores and formed substantially of carbon is formed.

11. The method according to claim 10, wherein the coating step is accomplished by a technique selected from the group consisting of dipping and spraying.

12. The method according to claim 10, wherein the carbon source is selected from the group consisting of thermoplastic resins and thermoset resins.

13. The method according to claim 10, wherein the carbon source is selected from the group consisting of pitches, phenol resin, and furan resin.

14. The method according to claim 10, when forming a liquid form of a carbon source is accomplished by admixing a liquid diluent to a carbon source, the method further comprises drying the coated cloth substrate after the coating step but before the carbonizing step to remove at least some of the liquid diluent from the coated cloth substrate, the drying being performed at a temperature of from greater than 25° C. to less than 600° C.

15. The method according to claim 10, wherein the cloth substrate is coated and carbonized as a single layer, thereby forming a single layer open-mesh carbon-fiber-reinforced carbon composite material.

16. The method according to claim 10, wherein the cloth substrate has a discernible surface texture and the open-mesh carbon-fiber-reinforced carbon composite material has a discernible surface texture similar to the texture of the cloth substrate.

17. A method for making a single layer open-mesh carbon-fiber-reinforced carbon composite material formed substantially of carbon, the method comprising the steps of:

forming a liquid form of a carbon source selected from the group consisting of thermoplastic resins and thermoset resins, the forming being accomplished by a technique selected from the group consisting of (i) admixing a liquid diluent to the carbon source and (ii) melting the carbon source;

coating a single layer carbon-fiber meshed cloth substrate in the form of a flexible woven fabric with the liquid form of the carbon source, the cloth substrate having a discernible surface texture and the thickness of the coating being such that, upon carbonization of the coating, the carbonized coated cloth substrate retains porosity and a discernible surface texture similar to that of the cloth substrate and is open-mesh and light-pervious having through-pores; and carbonizing the coating on the coated cloth substrate by heating the coated cloth substrate to a carbonizing temperature of from about 600° C. to about 2500° C. so that a flexible, light-pervious single layer open-mesh carbon-fiber-reinforced carbon composite material having through pores and formed substantially of carbon is formed, the open-mesh carbon-fiber-reinforced carbon composite material having a discernible surface texture similar to that of the cloth substrate.

* * * * *